(No Model.)
H. A. LINZELER & P. R. P. DUBAULT.
COUPLING FOR METALLIC FLEXIBLE TUBING.
No. 510,481. Patented Dec. 12, 1893.
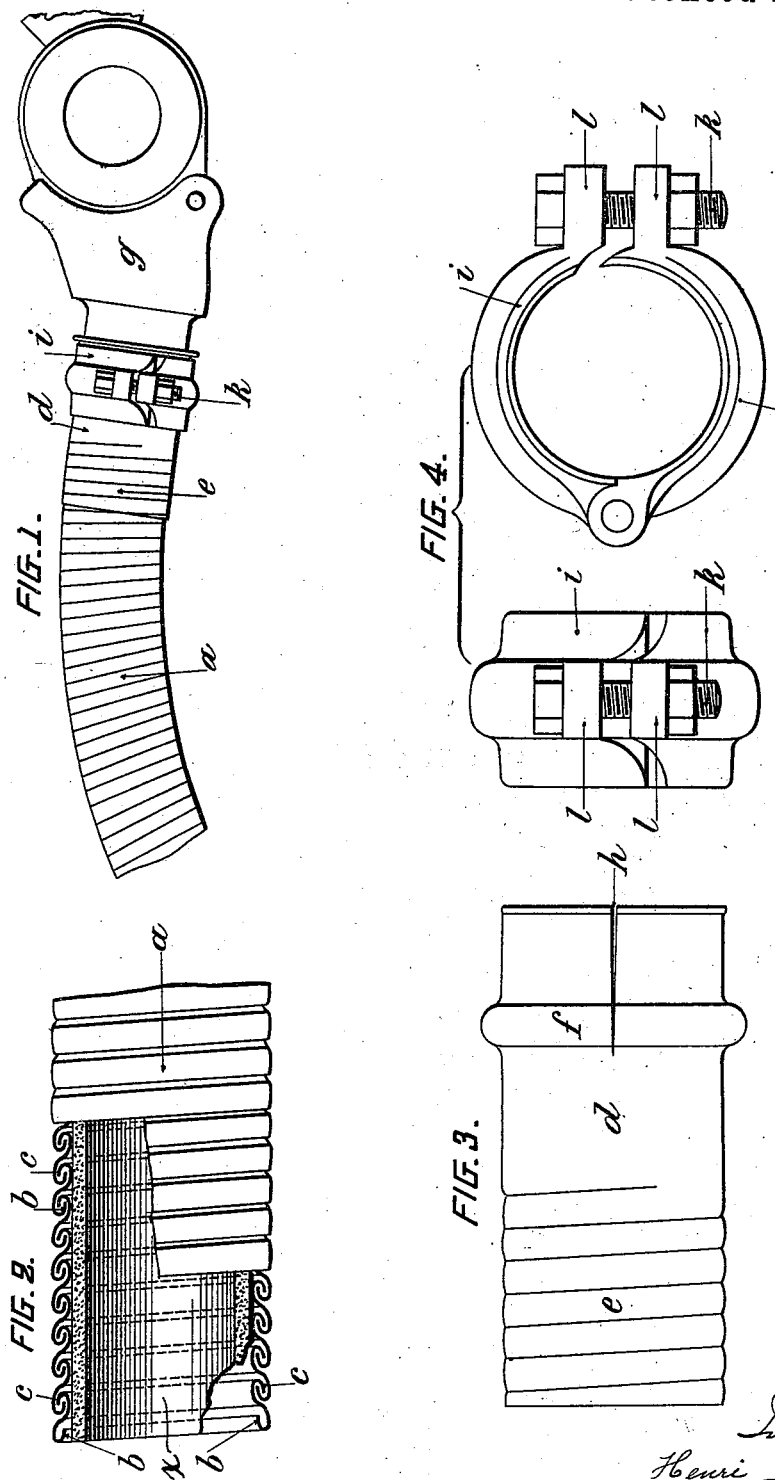

UNITED STATES PATENT OFFICE.

HENRI ANTOINE LINZELER AND PIERRE RENÉ PHILIPPE DUBAULT, OF PARIS, FRANCE.

COUPLING FOR METALLIC FLEXIBLE TUBING.

SPECIFICATION forming part of Letters Patent No. 510,481, dated December 12, 1893.

Application filed November 12, 1892. Serial No. 451,747. (No model.)

*To all whom it may concern:*

Be it known that we, HENRI ANTOINE LINZELER and PIERRE RENÉ PHILIPPE DUBAULT, of the city of Paris, France, have invented an Improvement in Metallic Flexible Tubing, of which the following is a full, clear, and exact description.

Our invention relates to the construction of flexible helically jointed metallic tubing for the pipe couplings of railway brakes, hose, water, gas, steam, or compressed air pipes. The flexible tubing is formed of a metallic strip of ∞ section wound helically so as by the interlocking of its oppositely curved edges to form a tube with which is combined a lining of caoutchouc, gutta-percha, leather, canvas or other water tight material.

Reference is to be had to the accompanying drawings forming part of this specification, of which—

Figure 1 represents the improved flexible tubing as applied to a brake coupling. Fig. 2 is a part sectional elevation of a portion of the tubing drawn to a larger scale. Fig. 3 shows the ferrule of the flexible tubing, and Fig. 4 shows a face and edge view of a hinged clamping collar for uniting the said end to the coupling joint.

The same letters of reference denote like parts in all the figures.

The flexible armor tube $a$ is formed of a metallic strip of ∞ section wound helically so that each helix overlaps and interlocks with the preceding helix and is itself overlapped by the succeeding helix. The flexibility of the tubing is dependent on the closeness or openness of the helices, while its extensibility depends upon the extent to which the oppositely directed edges $b\,c$ of the helices overlap, this interlocking maintaining the connection of the helices, notwithstanding the torsion in any direction to which the tubing may be subjected. The helically wound metallic tubing when lined with a tube $x$ of caoutchouc, gutta-percha, leather, canvas or other material as shown in Fig. 2, is rendered perfectly tight and capable of resisting the highest pressure whether internal or external without impairing its flexibility.

The flexible brake coupling pipe represented in Fig. 1 terminates in a ferrule $d$ (Figs. 1 and 3) the part $e$ of which has a screw thread formed in it for screwing upon the end of the helically-formed tube $a$ to which it is secured by riveting. This ferrule $d$ is formed with a circumferential hollow bead $f$, adapted to fit over the flanged end of the member $g$ of the coupling, the ferrule $d$ being split at several points, as shown at $h$ to enable it to be slipped over the flange on which it is secured by a hinged clamp $i$ which has an internal annular groove to fit over the bead $f$ and is tightened by a screw bolt $k$ passing through the lugs $l, l$, so that pipe $a$, ferrule $d$ and part $g$ of the coupling are rigidly secured together.

We claim—

A flexible armored pipe formed of a helically wound metallic strip ∞ shaped in cross section whose meeting edges are interlocked, combined with a watertight flexible lining, a ferrule screw threaded at one end to fit over the end of the pipe formed of the helically wound strip and split at the opposite end and provided with a circumferential hollow bead, and a hinged clamp having an internal annular groove adapted to fit over said bead and to be screwed together to compress the ferrule, substantially as described.

The foregoing specification of our metallic flexible tubing signed by us this 24th day of October, 1892.

HENRI ANTOINE LINZELER.
PIERRE RENÉ PHILIPPE DUBAULT.

Witnesses:
ROBT. M. HOOPER,
PIERRE ERNEST CISSIER.